United States Patent Office 3,431,774
Patented Mar. 11, 1969

1

3,431,774
ULTRASONIC TESTING APPARATUS FOR
MATERIAL IN SHEET OR FOIL
Jacques Dory, Paris, France, assignor to Realisations Ultrasoniques Limited Company, Villenoy-Les-Meaux, Seine-et-Marne, France
Filed Oct. 13, 1965, Ser. No. 495,643
Claims priority, application France, Oct. 28, 1964, 992,935
U.S. Cl. 73—67.8                    5 Claims
Int. Cl. G01n 9/24

ABSTRACT OF THE DISCLOSURE

An apparatus for ultrasonic testing of sheet material immerged in a liquid medium and including a moving rotating head which is adapted to generate a plurality of ultrasonic beams, whereby the whole surface of a large sheet may be scanned at comparatively high speed.

---

The invention relates to the submerged ultrasonic testing of solids.

As well known in the art, this testing process essentially consists in transmitting an ultrasonic wave beam, in the form of recurrent pulses, to a surface of the solid article under test, the transmission being through a liquid medium facilitating acoustic contact with the test item, with reception of the "echoes" arising from reflection of the ultrasonic waves on the top and bottom surfaces of the test article or on other reflecting surfaces therein, including faults to be detected. The echoes are converted into electric signals and displayed on the screen of a cathode ray tube. The ultrasonic beam explores the surface of the test article at a relatively low speed and, for instance, the horizontal scanning of the cathode ray tube is synchronised with the ultrasonic scanning of the article, whereas, for instance, the vertical scanning of the tube is much faster and is synchronised with the recurrent pulses. The electric echo signals switch on the normally "off" electron beam of the tube. The result is a kind of sectional representation of the test item, whose top surface, bottom surface and other reflecting surfaces appear on the screen (which must have adequate remanence) as light traces.

A process of this kind is disclosed, for instance, by the applicant's U.S. Patent No. 3,176,506 patented on June 26, 1962, entitled: "An ultrasonic inspection apparatus." When a process of this kind is used for rapid testing of material in the form of large sheets, such as light-alloy sheeting, the ultrasonic beam has to be moved rapidly at speeds of possibly up to several metres per second.

It is an object of this invention to provide an ultrasonic apparatus for the submerged testing of solids which is particularly adapted for the rapid testing of material in sheet or foil.

According to the invention, an ultrasonic testing apparatus comprises a plurality of transducers fitted to a rotating exploring head so as to produce a plurality of ultrasonic beams which consecutively scan the surface of the article under test along a small arc, means being provided to make the exploring head scan consecutive zones of a width at most equal to the width of the arc, such zones being parallel to one of the edges of the article under test, means being provided for consecutively connecting electrical transmitters and receivers to the various transducers.

Other objects and advantages of the invention will become apparent by the following description.

Figure 1:
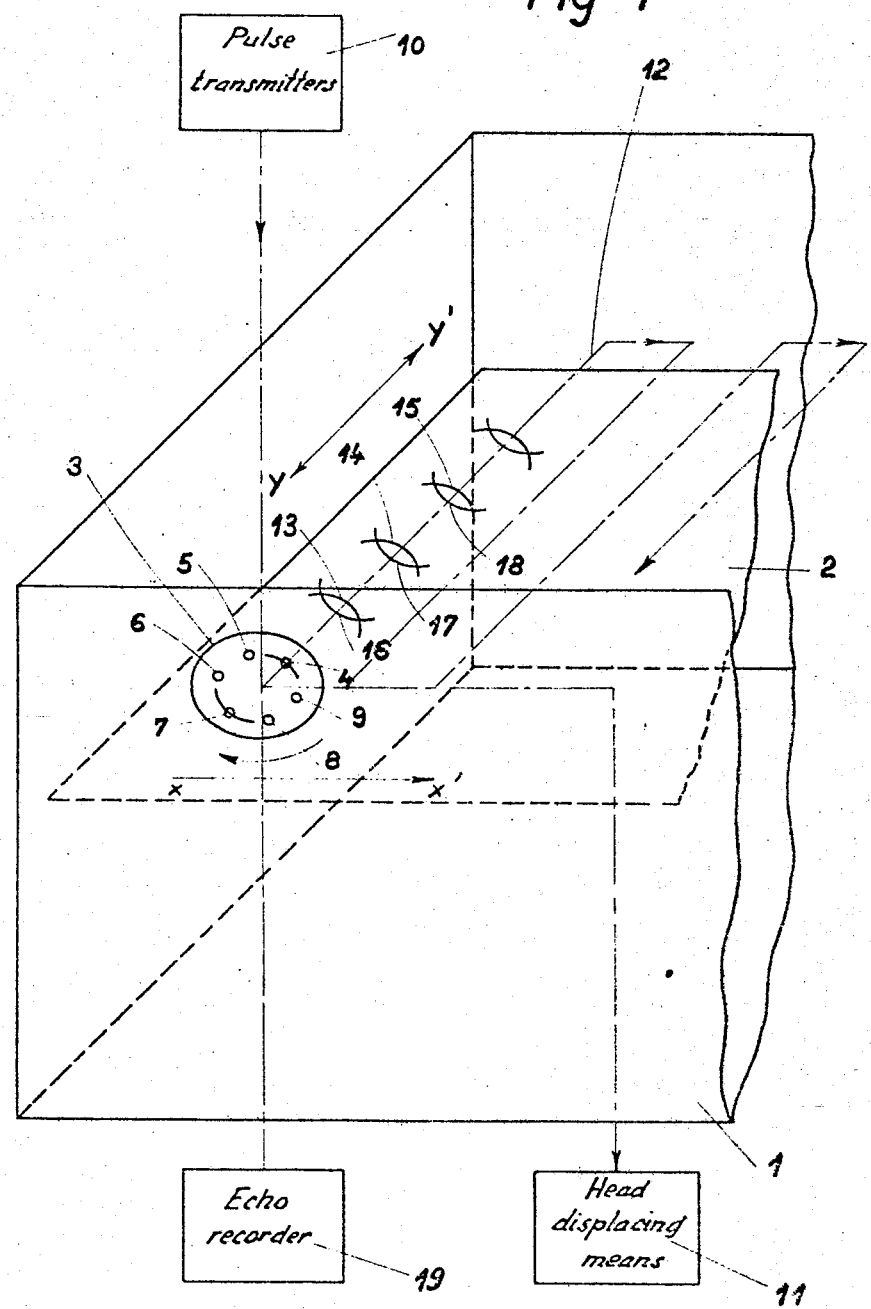

In the accompanying drawings:
FIG. 1 is a basic diagram of an apparatus according to the invention;

2

Figure 2:
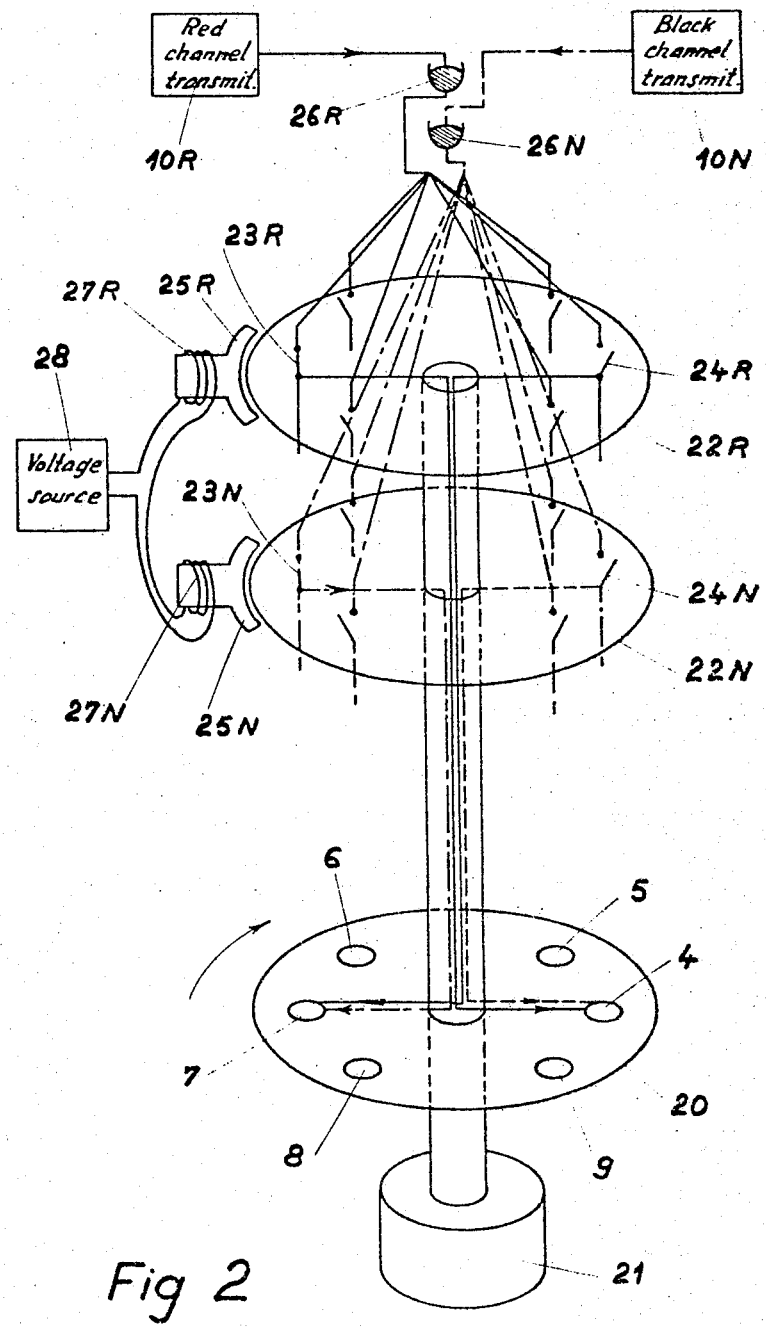
Figure 3:
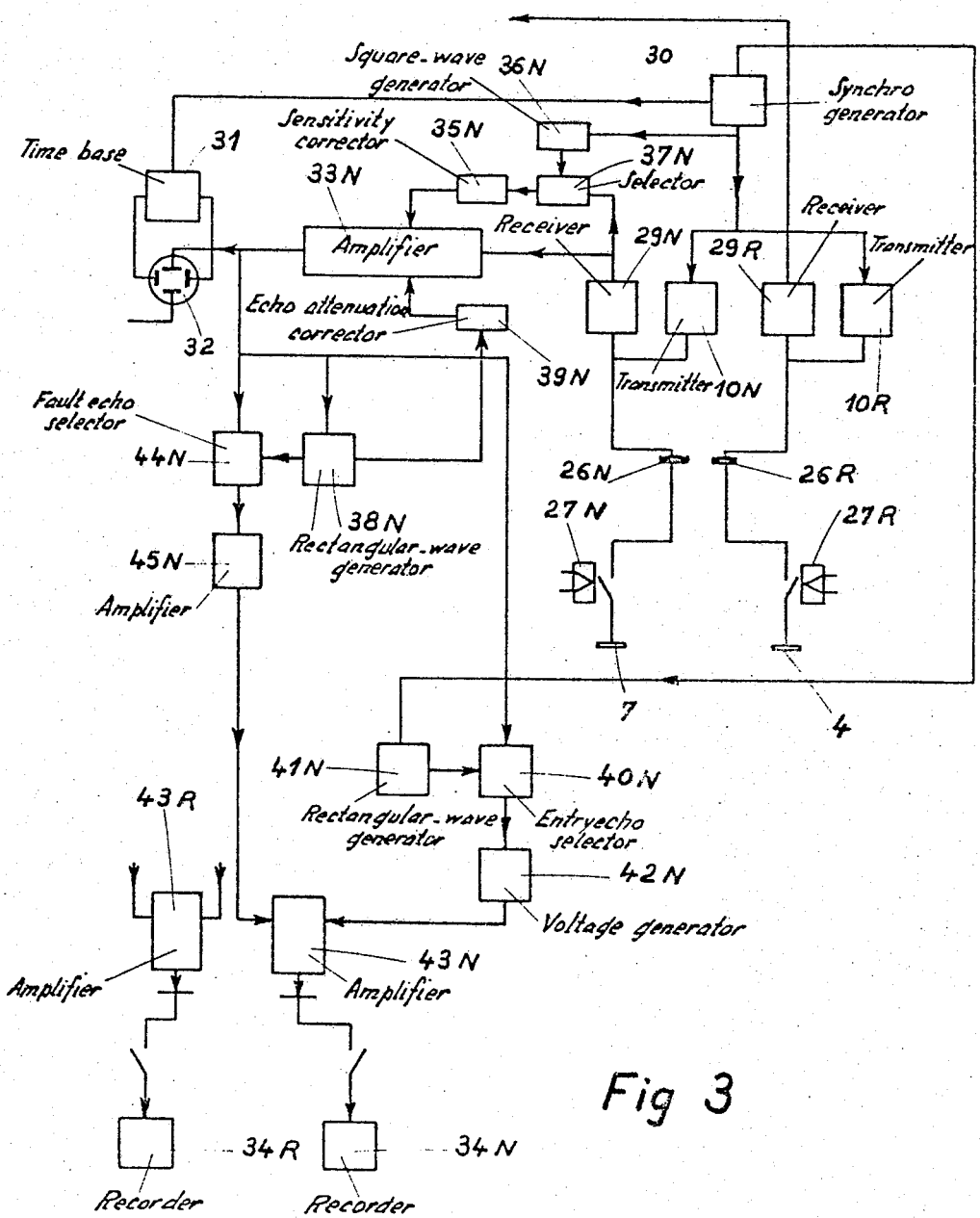

FIG. 2 is a diagram of the exploring head, and
FIG. 3 is a diagram of the electrical devices in the apparatus.

Referring to FIG. 1, a piece 2 of sheet material for testing is immerged in a water-filled tank 1 or the like. The sheet material 2 is scanned by an ultrasonic beam produced by an exploring head which is shown symbolically as a disc 3 and which has a number of transducers— six in the particular non-limitative example being described—which have references 4 to 9. The transducers are energized through the agency of a group 10 of high-frequency electric pulse transmitters. A rectangle 11 symbolises means for moving the disc shaped exploring head 3 in rotation around its axis and in translation along a chain-dotted line 12. In practice, the latter movement is provided by a travelling gantry or the like, which moves in a direction x–x', and by a carriage disposed on the gantry and moving in a direction y–y'. The exploring head therefore scans a number of strip-like zones substantially parallel with an edge of the sheet material 2. If one considers the scanning of the first such zone or strip, it will be apparent that the ultrasonic beam transmitted by the transducer 4 scans a small arc 13, the transducer 5 scans an arc 14, the transducer 7 scans an arc 15, and so on.

Similarly, in a diametrically opposite position on the disc 3, the transducer 7 scans an arc 16, the transducer 8 scans an arc 17, the transducer 9 scans an arc 18, and so on. The transducers act as ultrasonic transmitters and as receivers of echoes resulting from ultrasonic reflection on the top surface or the bottom surface of the piece 2 or again on the surfaces of any flaws possibly present in the article 2. The echoes go to a system 19 which receives and records the electric pulses and which will be described hereinafter. A changeover device which is not shown and which will be described hereinafter provides seriatim the simultaneous energisation of a first pair formed by two diametrically opposite transducers, as 4 and 7, then the energisation of a second pair, as 5 and 8, and so on, and can connect the receiver to a sequence of six write-in devices forming part of the recorder in the system 19.

As will be described hereinafter, this can provide two different explorations of the test item at sensitivities which can differ from one another. Considering just one such exploration, e.g. the exploration represented by the arcs 13, 14, 15 and so on, it can be assumed that, in the light of the size of the ultrasonic beam, the arcs are sufficiently close together for the exploration of the surfaces of the test article to be substantially continuous. This exploring of scanning process provided by the invention provides very rapid exploration of sheet material having a large surface area. As a non-limitative example, a checking rate of 0.6 m.²/minute is possible.

FIG. 2 diagrammatically illustrates the exploring head with its six transducers 4–9 mounted on a disc 20 which is, for instance, 40 cm. in diameter and which is rotated, in the direction indicated by an arrow, by a motor 21 e.g. at a rate of 5 or 6 r.p.m.

The transmitting system comprises two separate transmitters. One transmitter, 10R, is associated with what will be called the "red channel" while another transmitter 10N is associated with what will be called the "black channel." A disc 22R disposed on the same shaft as the disc 20 and therefore driven synchronously by the motor 21 carries six relays disposed diametrically opposite one another in pairs. The relays are disposed in an evacuated enclosure and no false changeover pulses are produced.

A relay 23R is disposed opposite a segmental pole piece 25R and is disposed diametrically opposite a relay 24R. Clearly, the six relays on the disc 22R are connected to the transmitter 10R by means of a rotating contact in the form of a mercury cup 26R. Similarly, six relays on a rotating disc 22N are connected via a rotating contact 26N to the transmitter 10N. The two pole pieces 25R, 25N are permanently magnetised by windings 27R, 27N supplied from a source 28 and therefore consecutively energise each of the pairs of relays, as 23R, 23N, during the synchronous rotation of the three discs 22R, 22N, 20.

For the sake of clarity, the connections between the relays and the transducers are not fully shown. Clearly, however, when the two relays 23R, 23N are energised the diametrically opposite transducers 7, 4 are supplied.

When the relay pair diametrically opposite the last-mentioned relay pair—i.e., 24R and 24N—pick up, the transducers 7, 4 are again supplied, but the transducer which was previously connected to the black channel is now connected to the red channel and vice versa. In other words, depending upon whether it is in one or the other of two diametrically opposite positions, each transducer is connected to one channel or the other, so that all the arcs 13–15 and so on are scanned by one channel while all the arcs 16–18 and so on are scanned by the other channel. Each channel therefore scans the entire surface of the sheet metal in the end. One channel has, for instance, a sensitivity such as to reveal faults of 1 mm. or more, and the other channel has a sensitivity such as to reveal faults of 7 mm. or more.

The recording system will not be described in detail and can, with advantage, be of the kind disclosed by the applicants' French Patent No. 1,210,801 of June 30, 1958 for "Two-scale recording system."

The red channel is recorded in red, and the black channel in black, by two separate recorders each comprising six writers disposed on a rotating disc and recording on a strip of paper through black and red carbon papers respectively. A system comprising two selsyns synchronises the two rotating discs with the exploring head. The recorders are mounted on a carriage disposed on a traveling gantry, this system reproducing the movement of the exploring head, for instance, on a scale of 1:10. What is provided, therefore, is, as it were, a plan view of the sheet material on a 1:10 scale.

FIG. 3 is a circuit diagram of the apparatus. There can be seen the transmitters 10N, 10R, the corresponding receivers 29N, 29R, the rotating mercury contacts 26N, 26R and the relays 27N, 27R leading, for instance, to the respective transducers 7 and 4. The two transmitters are synchronised by a generator 30 which also synchronises a time base 31 of an oscilloscope 32. The vertical deflection plates thereof are connected via an amplifier to the receiver of each channel. In order not to overload the drawing, only the amplifier 33N of the black channel is shown. Also provided for each channel are a number of circuits peculiar to the invention to connect the receiver to the corresponding recorder (34N or 34R). Only the system for the black channel is shown; its main items are the means for compensating for differences in the sensitivity of the six transducers used consecutively in the particular channel concerned, and means for making a write-in which the transducers pass beyond the edge of the sheet material and cease to explore the same, while providing an elimination of entry and bottom echo when said transducers do explore the said sheet material.

The means for compensating for difference in sensitivity comprise, in the case of the black chanel, a sensitivity corrector 35N which modifies the gain of the black-channel amplifier 33N; the corrector 35N receives signals from a selector 37N operated by a square-wave generator 36N triggered by the synchro generator 30. The selector 37N is connected to the output of preamplifier stages of the receiver 29N. The selector 37N selects the entry echo (echo produced by reflection of the ultrasonic beam on the top surface of the sheet material) and applies it to the corrector 35N which delivers a DC voltage proportional to the peak voltage of the selected echo. These compensating means make the amplifier output voltage substantially independent of transducer sensitivity. The system is not a negative feedback one; indeed, a negative feedback would not operate in this context because the ultrasonic beam moves considerably between consecutive transmitted pulses (beam speed is, for instance, something like 5 metres/sec.) and so echo amplitude may vary too rapidly for a negative feedback system to be effective. To ensure a very short response time, the signal delivered by the corrector is reset to zero after each sounding.

The means previously mentioned for detecting the edge of the sheet material comprise a selector 40N controlled by a rectangular-wave signal produced by a generator 41N triggered by the synchro generator 30 at proper times so as to select the entry echoes. A voltage generator 42N connected to the selector 40N provides a voltage having a comparatively low amplitude in the absence of any entry echo. Each time an entry echo is applied to the generator 42N, the same is inhibited. Such a generator will for instance be comprised of a voltage source connected to a gating device controlled by the selector 40N. The latter voltage is applied to amplifier 43N which also receives the voltage coming from the fault echoes (echoes given by flaws present in the sheet material) via circuits 44N, 45N to be described hereinafter. The voltage delivered by the amplifier 45N is of a larger amplitude than the voltage delivered by the voltage generator 42N and, consequently, zones outside the sheet material are indicated on the recording by a light grey colour while flaws inside the sheet material are indicated by a strong colour. These fault echoes are transmitted by the circuits 38N, 44N, 45N in the case of the black channel. The circuit 44N triggered by circuit 38N selects the echoes by opening itself at a short and constant interval of time after the entry echo and by closing itself a short and constant interval of time before the bottom echo, whereas 45N is an amplifier. The entry and bottom echoes are therefore reliably eliminated even in cases where they occur at times which vary because of irregularities in the sheet material surfaces.

The system shown in FIG. 3 also includes a device 39N for correcting echo attenuation due to the ultrasonic beam spreading out and being absorbed inside the sheet metal. The device 39N produces a voltage which increases from the entry echo, the device so acting on the sensitivity of the amplifier 33N as to increase such sensitivity in proportion as the echoes are further away from the entry echo. The device 39N is synchronized by a rectangular-wave generator 38N connected to the output of the amplifier 33N.

It is within the scope of those skilled in the art to provide practical forms of all these devices.

Of course, the system described and shown can be modified in various ways without departing from the scope of the invention.

What is claimed is:

1. An ultrasonic apparatus for the submerged testing of a sheet material presenting a top surface and a bottom surface, said apparatus comprising an exploring head having an axis and supporting a plurality of ultrasonic transducers, said ultrasonic transducers being arranged along a circle around said axis and having transmitting-receiving surfaces perpendicular to said axis; means for moving said exploring head in rotation around its axis; means for maintaining said axis perpendicular to the top surface of the sheet material under test and means for moving the exploring head whereby the axis moves so that its intersection with the said top surface of the sheet material under test runs a predetermined curve with the result that each ultrasonic transducer runs an hypocycloid over the said top surface, said hypocycloid being centered on said predetermined curve, whereby the sheet material is scanned over consecutive strip-like zones substantially parallel to said predetermined curve; means for energizing the transducers for transmission of pulses of ultrasonic vibration at regular intervals and receiver means, said means for energizing the transducers comprising a synchro generator and transmitter means connected to said synchro generator; switching means for consecutively changing over the said transmitter and receiver means between the various transducers of said plurality whereby each one of said transducers is connected to the said transmitter and receiver means and operated as an ultrasonic emitter-receiver to perform an inspection during its movement along a predetermined arc portion of the said hypocycloid said portion being substantially transverse to the direction of movement of the exploring head along the said predetermined curve, whereby the transducers collectively scan along a plurality of arcs spaced in the direction of the head movement along said curve.

2. An ultrasonic apparatus in accordance with claim 1, in which said switching means comprise at least one mobile supporting member and at least one stationary electromagnet, said supporting member having an axis, means for rotating said supporting member around said axis in synchronism with the rotation of said exploring head, said supporting member having a plurality of electromagnetic relays arranged along a circle around said axis, said stationary electromagnet being located at a predetermined point of said circle and operating said relays when they pass along said predetermined point.

3. An ultrasonic apparatus in accordance with claim 1, in which said transducers include first and second groups, the transducers of the first group being diametrically opposite to the respective transducers of the second group; said transmitter means comprise at least first and second distinct transmitter channels, said receiver means comprise at least first and second distinct receiver channels having different sensitivities, and said switching means comprises at least first and second supporting members and at least first and second stationary electromagnets, each supporting member having an axis; means for rotating each supporting member around its axis in synchronism with the rotation of said exploring head; first and second pluralities of electromagnetic relays respectively arranged on the respective supporting members along first and second circles around the said axes, said first stationary electromagnet being located at a first predetermined point of first circle and operating the relays of said first plurality when they pass along said first point and said second stationary electromagnet being located at a second predetermined point of said second circle and operating the relays of said second plurality when they pass along said second point, the relays of the first plurality connecting, when operated, the respective transducers of the first group to the first transmitter channel and to the first receiver channel, the relays of the second plurality connecting when operated, the respective transducers of the second group to the second transmitter channel and to the second receiver channel, whereby, in the time of one revolution of the exploring head, each transducer is connected consecutively, firstly to the first transmitter channel and to the first receiver channel and secondly to the second transmitter channel and to the second receiver channel.

4. An ultrasonic apparatus in accordance with claim 3 in which said receiver means comprise a receiver unit, an amplifier having a control input and an output and correcting means for the correction of the amplifier sensitivity at each changeover between transducers, said correcting means comprising an entry echo selector having an input and an output and a sensitivity corrector having an input and an output, the output of the selector being connected to the input of the sensitivity corrector, the output of the sensitivity corrector being connected to the control input of the amplifier and the input of the entry echo selector being connected to the output of the receiver unit whereby a voltage proportional to the peak amplitude of the entry echo is applied to the said control input of the amplifier for regulating the amplification factor of said amplifier so that the output voltage of said amplifier is substantially independent of the amplitude of the signal delivered by the transducers in response to the entry echo.

5. An ultrasonic apparatus in accordance with claim 3, in which said receiver means comprise a recorder, an amplifier having an output and means for producing a write-in on the said recorder whenever the operating transducer passes beyond one edge of the sheet material under test and ceases to explore the same so that the edges can be located on the recording, said means for producing a write-in comprising an entry echo selector having an input and an output, a voltage generator having an input and an output and a further amplifier having an input and an output, the input of the entry echo selector being connected to the output of said amplifier, the output of the entry echo selector being connected to the input of the voltage generator, the output of the voltage generator being connected to the input of said further amplifier and the output of said further amplifier being connected to the input of the recorder whereby in the presence of an entry echo the voltage generator does not energize the recorder while in the absence of an entry echo the voltage generator energizes the recorder which then makes a write-in.

References Cited

UNITED STATES PATENTS 3,023,611 3/1962 Howry _____ 73—67.9 XR
3,262,306 7/1966 Henry _____ 73—67.9

FOREIGN PATENTS 1,308,800 10/1962 France.
1,340,990 9/1963 France.

RICHARD C. QUEISSER, *Primary Examiner.*

JOHN P. BEAUCHAMP, *Assistant Examiner.*